OPERATION CHECKING SYSTEM FOR DATA STORAGE AND PROCESSING MACHINES
Filed Aug. 29, 1958
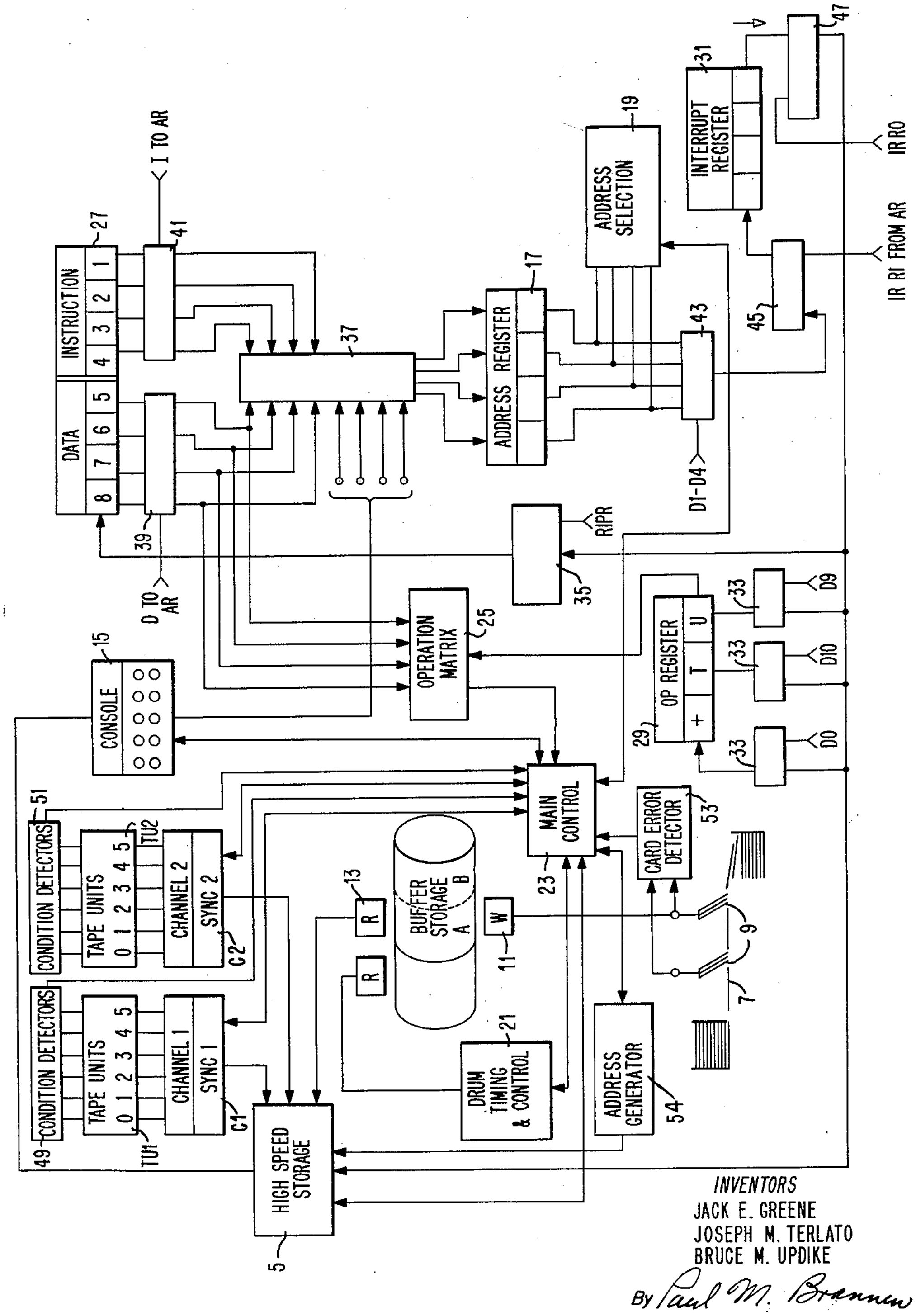
INVENTORS
JACK E. GREENE
JOSEPH M. TERLATO
BRUCE M. UPDIKE
By Paul M. Brannen
AGENT United States Patent Office 3,077,579

Patented Feb. 12, 1963

3,077,579

OPERATION CHECKING SYSTEM FOR DATA STORAGE AND PROCESSING MACHINES

Jack E. Greene, Vestal, Joseph M. Terlato, Bronx, and Bruce M. Updike, Endwell, N.Y., assignors to International Business Machines Corporation, New York, N.Y., a corporation of New York Filed Aug. 29, 1958, Ser. No. 758,064
9 Claims. (Cl. 340—172.5)

This invention relates to operation checking systems, particularly for use with high speed data storage and processing systems and more particularly to an improved operation checking system for use with stored program type data processing machines.

A frequently used system of classifying high speed digital data storage and processing machines is according to the type of programming used. A stored program type machine is one in which the sequence of steps of data procesing or the sequence of functions of the machine is under the control of instructions contained in some type of storage device or devices within the machine. Heretofore machines of this type have been built having high programming capacity, high storage capacity, and a high degree of flexibility and the prime object of this invention is to provide improved automatic operation checking features for such a machine.

The present invention is disclosed herein as embodied in a data processing machine of a general type similar in many respects to that shown and described in detail in common assignee's copending application, for F. E. Hamilton et al., Serial Number 544,520, filed November 2, 1955, now Patent 2,959,351, issued November 8, 1960, and entitled, "Data Storage and Processing Machine." However, the invention is not limited to this type of data processing machine, but may be equally as well employed in calculators of other types. The machine disclosed in said patent is provided with a magnetic drum for storing a large quantity of data as magnetized spots on its surface. A program storage device is provided for storing a single program step or word. The program word is divided into three portions; an address portion for instructing the machine where data to be processed is located in storage, in operation portion for instructing the machine what operation or process the machine is to perform with the data found at the address of the address portion, and an instruction portion for instructing the machine where the next program step is located in storage. An address register and an operation register are provided for receiving the address portion and the operation portion respectively from the program storage device. Circuity is provided under control of the address register for selecting any storage position on the drum or any other storage device in the machine in accordance with the value stored in the address register. Circuitry is also provided under the control of the operation register for determining the operation the machine is to perform on the data found at a selected address position. After an address is selected and the data found at the address is operated upon by the machine, the instruction portion of the program value is entered into the address register from program storage to replace the value previously in the register. A new program step located at the address in storage corresponding to the instruction portion of the program step in the address register is selected and transferred into the program storage device to replace the value previously stored therein. Alternately a test may be made by the machine, and if a predetermined condition is found to exist, the address portion of a program step may be caused to remain in the address register and the next program step selected in accordance therewith and entered into the program storage device. Large numbers of program values and large amounts of other data may be stored on the magnetic drum. Other types of storage such as magnetic core storage may be used in addition to, or instead of, the magnetic drum. Thus, the sequence of the above-outlined procedure may automatically continue for a large number of program steps.

Accumulators, adders and distributor circuits are also provided in the machine for performing the vaious calculating operations called for by the operation portions of the program words. A stored sequence of such program or instruction words forms a program or "program routine."

The machine is programmed or preloaded to carry out a plurality of main program routines. Preloading is generally accomplished by loading a few instructions into storage by the use of entry switches on the control console. These few instructions are used to enter more complete loading routines. The original data and instructions are normally stored in assigned general storage locations from punched cards or magnetic tapes during the loading process. During operation of the machine, should an abnormal condition or error occur, certain error circuits will be called in and the machine stopped. The operator, then, by depressing an error reset key on the console, can reset the error circuits and cause the program to continue when the program start key is depressed. Also, circuitry is provided whereby the operator at the console may reset the computer which has been stopped due to an abnormal or error condition, restart the machine and place the machine under control of so-called rerun instructions which were preloaded into the machine and which in effect will cause the machine to go back and rerun a portion or all of the main routine which was in progress when the abnormal or error condition occurred.

It can be readily understood, then, that in machines of the type already known in the art, abnormal or error conditions arising in the machine call for manual intervention by the operator and to provide for rerun operations it is necessary for the programmer, when loading the machine, to store in the machine a plurality of rerun instructions. These rerun instructions will have to be inserted at random intervals throughout the sequence of program routines, or at least at the start of each program routine, since it cannot be known in advance where in the sequence of operations abnormal conditions will arise. Manual intervention for corrections and reruns of program routines are, of course, quite time consuming as well as additional burdens on the operator and programmer of the machine. Moreover, depending upon the type of abnormal or error condition, different error-correcting routines may be required, and the programming of such routines in any sequence to be used in a rerun operation is time consuming. Also, the running of a plurality of such subroutines in sequence, in a searching type of operation, may require a considerable amount of computer time.

It is accordingly an object of this invention to provide an operation checking system for a data processing machine which automatically collects information concerning the operation of the machine for utilization in correcting errors which may occur.

A further object of the invention is to provide an operation checking system for a data processing machine in which the operation of peripheral equipment is monitored and the collected information is supplied to the machine in a form directly usable by the machine for automatically initiating error correction operations.

Another object of the invention is to provide an operation checking system for a data processing machine in which information relating to the operation of peripheral equipment is collected and formed into a word which can be stored in the machine for subsequent referral.

Still another object of the invention is to provide an operation checking system for a data processing machine in which the designation of a particular unit of peripheral apparatus, the operating condition of the unit, the last operating instruction delivered to the unit, and other pertinent information is utilized to generate data in the form of selected digits which are assembled into a word format and supplied to the data storage of the machine for subsequent referral.

Yet another object of the invention is to provide an operation checking system for a data processing machine in which a status word is generated in accordance with the operation of peripheral equipment, and the information in the status word is coded to provide the machine with information by which a proper subroutine is selected in accordance with the condition denoted by the status word.

Another object of the invention is to provide an operation checking system for a data processing machine in which a particular digital value is encoded in a status word generated in accordance with the operation of peripheral equipment, the digital value representing a condition code, which value is employed as at least a portion of an instruction address which will lead the machine to a subroutine which takes such action as the condition code indicates as necessary.

Still another object of the invention is to provide an operation checking system for a data processing machine in which a status word, generated in accordance with the operation of peripheral equipment, is stored in a predetermined location in the machine storage facility, to which the machine program may be automatically referred in the event that it becomes necessary to check such conditions.

A general object of the invention is to provide an improved operation checking system for a data processing machine.

Briefly described, the invention comprises means associated with the peripheral equipment for detecting various conditions which can occur during operation of the equipment, such for example, as an "end-of-file" condition in a tape storage unit. This information is encoded by conventional means to provide a condition code which consists of one or more single or plural digit numbers, each of which indicates a unique condition, which may or may not be considered abnormal, in the operation of the peripheral unit. This condition code is incorporated in a word of information, generated in accordance with existing conditions in the machine, and the word is then transferred to a preassigned and fixed location in the general or main storage facility of the machine. The word may also include the designation of the unit involved, the instruction which the unit was carrying out, or any other suitable information.

This information or status word may then be utilized either automatically or via programming, to cause the machine to initiate a suitable subroutine in accordance with the condition denoted by the condition code portion of the status word.

Other objects of the invention will be pointed out in the following description and claims and illustrated in the accompanying drawing, which discloses, by way of example, the principle of the invention and the best mode, which has been contemplated, of applying that principle.

The single accompanying drawing is a general schematic diagram of the essential components of a stored program type data processing machine embodying the principles of the invention.

In the drawing there is shown a simplified block diagram of only those components of a stored program type data processing machine which are affected by the operation of the present invention. For the sake of brevity, the ensuing general description of the machine system and the necessary components will be brief in nature and it is to be understood that, where necessary, reference may be made to the afore-mentioned application, Serial Number 544,520, now Patent 2,959,351, for a complete detailed disclosure of any of these components as well as the complete data processing machine.

The machine has high-speed general storage 5, in which both data and program instruction words may be stored. A word consists of up to ten digits and algebraic sign. Magnetic drum buffer storage A and B is provided between the main storage and the certain of the input and output units. For example, data information on record cards 7 may be sensed in a card reading machine by reading brushes 9 and the data recorded in buffer storage A of the drum through a write head 11. The data in buffer storage A may be taken out through a read head 13 and placed in the high-speed storage unit 5. It can also be seen that magnetic tape units TU1 and TU2, for example, may feed tape data through their respective channels C1, C2 into the high-speed storage 5. Information in storage 5 may also, for example, be recorded in buffer storage on the drum for transmission to output units, such as a printer or punch, not shown, or it may be sent to the control console 15 of the machine. Also, data in general storage 5 may be transmitted to other locations within the machine. Of course, it is understood that many different kinds and numbers of input and output devices could be used for transferring information into and out of the high-speed storage and/or the tape unit.

Words are stored serially on the drum, and in parallel in the high-speed storage. Further, the digits of a word are stored serially within each word interval on the drum, and in parallel in the high-speed storage. Digits are represented by parallel combinations of bits. Of course, other arrangements known in the art can be employed.

Each of the word storage positions on the drum and in the high-speed storage is located by a four digit code or "address."

In the stored programming system used by this machine, each instruction (program step) is stored in a word storage location as a ten digit word. The coded digits of an instruction word, when interpreted by the program control circuits, give information as to which operation is to be performed, in which storage location to fined the data to be used in performing the operation and in which storage location the next ten digit instruction word is to be found. A stored sequence of such instruction words forms a program or "program routine."

Calculations in the machine are performed by electronic means which will not be shown or described in detail herein since they are not required for an understanding of the present invention. The calculator can add, subtract, multiply, divide and make logical tests such as plus, minus and zero accumulator balance. The program routine can be altered by any of these logical tests or by sensing a control punch in a card or by manual switching via the console. The arithmetic operations, add, subtract, multiply, divide, shift and table lookup are accomplished in general by merging, in a main adder, accumulator outputs, or their substitutes, or general storage outputs. These outputs are merged in sequences as specified by the operation and the result is stored back in the accumulator and thence general storage. All of the arithmetical and logical operations are built into the machine and they are activated by the operation code portion of the instruction word.

The arithmetic units of the machine as disclosed in the mentioned application are designed to handle numbers in a serial fashion. Thus during calculations the ten digit words are processed by the arithmetic units on a digit by digit basis with machine time progressing from the units digit through the highest order digit of word.

The basic cyclical timings of the machine are therefore related to digit position rather than digit value. In the arithmetic portion of the machine, the value of a digit is determined by simultaneous combinations of bit pulses on two of five parallel information lines.

The general or high-speed storage portion 5 of the machine has a large number of addressable locations where ten digit words can be stored. Each of these word positions is located by placing the four digit address portion of the instruction word in the address register 17 where it activates the address selection circuits 19.

The buffer storage bands A and B of the drum previously referred to are used for readin and readout buffer storage, called read buffer storage and punch buffer storage, respectively. For a detailed showing of how information on punched cards may be read into buffer storage, reference may be had to the application of F. E. Hamilton et al., Serial Number 399,496, filed December 21, 1953, now Patent 2,877,450, issued March 10, 1959, and assigned to the present assignee. For a detailed showing of how informatioin may be read out of buffer storage to control, for example, a card punching machine, reference may be had to the application of F. E. Hamilton et al., Serial Number 464,516, filed October 25, 1954, now Patent 2,919,429, issued December 29, 1959, and assigned to the present assignee.

Timing of the various operations is governed by suitable timing circuits, including timing pulses derived from the buffer drum, which are supplied to suitable drum timing and control circuits 21, which also cooperate with the main control 23 in synchronizing the operation of all of the machine.

The machine uses a system of stored programming to provide the necessary sequence of operations for the solution of a problem, e.g., the machine refers to any of its own storage locations to obtain a previously stored or computed ten digit, coded, instruction word whose digit values can be interpreted by the machine to determine what its next operation should be.

Original data and instructions are normally stored in storage locations from punched cards during the loading process. Additional data and/or instructions may be inserted from cards during the solution of the problem. Each instruction (program step) is stored as a word. Since both data and instructions are stored in the same manner, an instruction word can be subjected to arithmetical operations and thus can be altered by programming. The meaning of any valid coded instruction is buit into the machine and any sequence of instructions is called the program routine.

All instructions are in the form of ten digit words with a sign carried along which may be employed for additional operating code instructions. The significance of the sign in the instruction word need not be considered further for an understanding of the present invention.

A typical instruction word format may be represented as follows:

| Sign | OP | | D | | | | I | | | |
|---|---|---|---|---|---|---|---|---|---|---|
| ± | X | X | X | X | X | X | X | X | X | X |
| D0 | D10 | D9 | D8 | D7 | D6 | D5 | D4 | D3 | D2 | D1 |
| Sign | Operation Code | | Data Address | | | | Instruction Address | | | |

Reading from left to right, the first digit position is the sign designation. Digit positions D10 and D9 are the operation code which tells the machine which of its several operations to perform on this program step. Positions D8–D5 are the data address and usually means either the location of information to be used in the operation, or the location where the information is to be stored as a result of the operation. Positions D4–D1 are the instruction address which indicates the location in storage of the instruction word for the next program step.

The arithmetical and logical operations of the machine are controlled by program control circuits which comprise a distributor or operation matrix 25, a program step storage unit or program register 27, the operation register 29, the address register 17, and an interrupt register 31. The information flows from general storage and the operational code data is transmitted at digit "0," "10" and "9" times through suitable "and" switches 33 and placed in the sign, tens and units positions of the operation register 29.

The data and instruction portions of the program word is fed into the program register 27 via a switch 35 which is enabled by a suitable readin program signal designated RIPR. The information is read out of the program register in parallel and into an "OR" switch 37 by way of two "and" switches 39 and 41. The switch 39 transfer the data portion of the word into the switch 37 and address register under control of a D to AR signal and the instruction portion of the word is transferred into the address register under control of the switch 41 and an I to AR signal. From the address register 17 the information is fed into the address selection unit 19 and also into an "and" switch 43 which is under control of address register scan signals D1–D4 for transmitting the information out of the address register and into an "and" switch 45. The switch 45 under control of an interrupt register readin signal IRRI serves to enter into the interrupt register 31 the same information that is in the address register unless an interrupt condition occurs, as will be explained later. The information in the interrupt register is fed out and transmitted to the storage unit 5 by means of an "and" switch 47 under control of an interrupt register readout signal IRRO. It will also be noted with regard to the general flow of information that the data information in the program register is also fed into the operation matrix 25 where it is combined with the operational code information coming from the operation register. The operation matrix functions to send signals to the calculator instructing the type of operation which is to be performed and where to perform it in the machine. Also, the main console 15 includes a keyboard which can be used to key information into the switch 37 for entry into the address register.

Each program step is performed in two parts or "half cycles." On the first part of "I" half cycle, the operation, program and address registers are reset and a new instruction word is read into the operation register and program register. Then, the "I" part of the instruction word in the program register is transferred to the address register for interpretation and use by the address selection unit to select the next "I" address. The operation code in the operation register enters the operation matrix. On the second part or "D" half cycle, the address register is reset and the data part of the instruction word in the program register is transferred into the address register where it is interpreted and used to select the "D" address. The data part of the word in the program register is also entered into the operation matrix where it is combined with the operational code data entered therein. The operational matrix interprets the data and develops signals for controlling the machine to carry out the operation called for by the instruction word. This completes a program step.

As soon as the operation is started, program or main control causes a return to the "I" half cycle. The operation, program and address registers are reset and the next instruction word is read out of the "I" address location and into the program register replacing the previous instruction word and the above sequence is repeated. Interlock circuitry is provided so that a program advance will be prevented, except for read or punch operations, until the previous program step has finished using the arithmetic units of the machine. In this manner the machine advances through the steps of a stored program routine.

This half cycle action, by which a program step is performed, is accomplished by a program control commutator, not shown, which controls the sequence of actions necessary to advance through any program step. This control commutator, or alternator, is a two branched ring with several positions in each branch. As it cycles, it alternately advances through each branch. The positions of one branch control the functions of the "I" half cycle, while the positions of the other branch control the functions of the "D" half cycle. Normally the ring must advance through both branches, first "I" and then "D," to complete a program step. The outputs of the steps of the control commutator are used to conrol the various transfers of data required for the accomplishment of the program step.

The program and interrupt registers may be of the shifting register type in the form of a latch ring circuit wherein each stage constitutes a storage device which includes a pair of inverters, a cathode follower for providing the output, a pair of diodes arranged as a voltage coincidence switch for latching the stage "on," and a third inverter, coupling one stage to the next, and which serves as a storage medium for the information during shifting operations of the ring. This type of register is capable of serial entry such as required for readin of the instruction from its reference location in addressable storage elsewhere, serial readout such as is required to permit indexing of instructions, and parallel readout such as is required for operation of operation code matrices and address selection matrices by instructions directly from the register. Information in these registers may be read out statically in parallel or dynamically in serial form. Other forms of registers can, of course, be employed.

The operation and address registers are static storage units with each position using latches or other storage devices to indicate the data code value in coded form. Once a code is entered, continuously steady state output is available from these registers until reset.

The high-speed storage unit 5 is provided with a large number of word storage locations and since all words are individually addressable, data or an instruction can be stored in any storage location. However, certain areas of storage are reserved for particular uses, as will be subsequently explained. The high-speed storage is used for the assembly of information for writing on magnetic tape and all records read from tape enter this storage. The storage unit is equipped with three timing rings, each ring having access to the entire storage unit. One of the rings, not shown, connects the storage unit with the drum and is specifically associated with the compute function of the machine. Each one of the other two, designated sync 1 and sync 2, is associated with a tape control channel.

As shown in the drawing, the machine can be equipped with twelve magnetic tapes, each tape unit TU1 and TU2 comprising six tape drives designated 0 through 5. The control channels 1 and 2 permit each unit to operate independently and as a result simultaneous read-read, read-write or write-write tape operations are possible overlapped with computer operations. All tape operations are initiated by a single operation code and its associated D-address. The D-address controls the tape unit to be used, the channel to be used, the tape operation (read, write, backspace, etc.) to be performed and the mode of operation to be assumed after the command has been executed.

The control console 15 and associated keyboard contains switches and lights through which the operator may observe and control the operation of the machine. In connection with programming, the console is provided with a plurality of manually-operated switches and/or a keyboard, which can be used to enter data or instructions into any storage location and are generally used to enter corrections when correcting a program. They may be consulted by the program by using a particular assigned address. Address selection switches are also provided and which may be used to set an address at which a program is to be stopped or to enter an address directly into the address register. Program start, stop and reset operations may also be controlled from the console.

In addition to the foregoing, the peripheral units of the calculator are each provided with suitable means for determining the status or condition of the operation of the unit. Each of the tape units TU1 and TU2 have associated therewith condition detectors 49 and 51 respectively, and the card reader has associated therewith a card error detector 53. It is to be understood that other peripheral units, such as printers or punches, can also be so equipped.

Each of the condition or error detectors constitutes appropriate checking devices and circuitry which will provide one or more different signals indicating the status or condition of the device with which it is associated. Thus, for example, the condition detectors 49 and 51 will provide signals coded in digit form, for each of the tape drives, indicating the following:

A. Error—Digit value 1—This signal will be generated by any one or more of the following:
  (1) A tape information error as detected by a bit redundancy check, failure to write acceptable quality or a code validity check.
  (2) Operation check to make sure that the storage unit and the tape unit are in the same status (read or write, not both).
  (3) On read operations each tape record is checked to make sure that an integral number of words was read.

These tape error indications are preferrably stored in latches, which are automatically reset after entry of the error indication in the status word.

B. CLR (Correct Length Record)—Digit value 2—This signal is generated when the tape ring start and stop setting coincide at the end of record time, the record is of exact word length, and no error has occurred.

C. SLR (Short Length Record)—Digit value 3—This signal is generated when the buffer ring start and stop settings do not coincide prior to or at the end of record time, the record is of exact word length, and no error has occurred.

D. LLR (Long Length Record)—Digit value 4—Occurs when the buffer ring start and stop settings coincide prior to the end of record time, the record is of exact word length, and no error has occurred.

E. EOF (End of File)—Digit value 5—Occurs on reading a tape mark or writing into a foil strip located at the end of the tape and sensed photoelectrically. A Write End of File instruction will produce a CLR indication.

It can be seen from the foregoing that the apparatus may be arranged to provide any various other indications, either of normal or abnormal conditions. Also, although unit digit values are illustrated in the foregoing, it is obvious that other orders can be employed by choice.

In connection with the card reading equipment, the card error detector 53 can provide suitably coded values to indicate conditions such as correct card record, error, etc., in a manner similar to the described for the tape units.

An address generator 54 is also provided, with suitable connections to the high-speed storage 5 and the main control 23, whereby address codes may be generated in response to information supplied by the tape control units TU1 and TU2, via the switching circuits of the main control unit 23, and the coded address information supplied to the high-speed storage 5. In this manner, the pertinent information relating to a tape operation command, plus the operating condition of the tape unit in question, can be encoded in a status word which is stored at a predetermined location in general storage, since the address generator will automatically determine the address to which the information should be routed. The status word information is determined by appropriate logic circuitry in the tape control units, which combine the operating condition information, the designation of the unit involved, the last instruction given to the unit, and any other pertinent information, into a status word, which is then transferred to the general storage 5, at the location determined by address generator 54.

Thus far there has been described briefly some of the functional units and operating principles of a stored program type data processing machine. The general machine system is of the type well known in the computing art and in the interest of simplicity only those functional units which enter into the operation of the present invention has been discussed and discussion of other functional units of the machine such as accumulators, table lookup, timing and control circuits, translators, and the like has been purposely omitted. Moreover, the details of the timing and control circuits have been omitted, since their actual form is immaterial to this invention.

Having thus described in general terms the functional units of the machine and its peripheral equipment and the manner in which status codes or indications are provided, it is believed that the description of the invention will be enhanced by describing the mode of operation with special reference to the manner in which the status words are generated and employed. Although the description to follow is limited, for the sake of brevity, to operations involving the tape units, it will be apparent that operations involving other peripheral equipment will be similar in nature and hence need not be described.

It should first be pointed out that in the arrangement shown in the drawing, the machine normally operates in a non-interrupt mode, but can enter an interrupt mode, either automatically by detecting abnormal conditions or at the discretion of the programmer or operator. When the interrupt is programmer planned, two or more programs can be processed at the same time with automatic scheduling between the programs being done by the machine. Certain conditions may be indicated and utilized to cause an interrupt operation to take place automatically, whether or not the program calls for interrupt operation. For example, tape errors and end-of-file conditions may cause an automatic interrupt operation, while ordinary tape operations or card input-output operations may or may not initiate an interrupt operation, at the discretion of the programmer.

Interrupt register 31 is employed in such interrupt operations. At the same time that the I-address portion of each instruction word is sent to the address register it is also entered into the interrupt register 31 via switches 43 and 45. When an interrupt condition occurs, the next instruction is not taken from the normal I-address location, but rather from a predetermined location which is fixed and determined by the type of interrupt. The address of the next instruction in the main routine is saved in the interrupt register, since the address register will now be required for use in executing the interrupt routine. Upon completion of the interrupt routine, control can be returned to the main program and the address of the next main program instruction can be obtained at that time from the interrupt register. Returning the control to the main program or a different subroutine is accomplished by using a release interrupt command at the end of the interrupt routine, which command directs the calculator to the address of the next instruction.

For a tape write interrupt operation, the tape control interrupt signal is initiated upon the coincidence of the start and stop address in the timing rings 1 and 2 associated with the core storage unit. In the case of a tape read interrupt operation, the tape control unit recognizes the end of a record by the absence of data to initiate an interrupt signal. However, these tape interrupt signals will not be sent until after the tape status word has been stored in the general storage unit.

The card input-output interrupt feature makes it possible to operate a card input, card punch, or printed output device on an interrupt basis. The input or output unit to be operated on interrupt basis is manually selected by a switch on the console and more than one switch can be provided, making it possible to operate a plurality of units on an interrupt basis. No special interrupt operation codes are required for card input-output operations. Instead, the selected unit operates on an interrupt basis whenever it receives an operation command unless the interrupt subroutine uses a tape unit.

If the input interrupt subroutine does not involve tape operations, the interrupt signal occurs as soon as the input buffer area is filled by the card reading device attached to it. If the input interrupt subroutine does include tape opeartions, the interrupt signal will occur only when the input buffer area is filled by the card reading device and the tape unit channel used in the subroutine is free. If an output interrupt subroutine does not include tape operations, the interrupt signal is available when the information in the output buffer area is completely transferred to the attached output device. If the output interrupt subroutine does contain tape operations, the interrupt signal will only be available when the information in the output area is completely transferred to the attached output device and the tape unit channel used in the subroutine is free. The delay of the interrupt signal until the required tape unit channel is free is under control of a console switch.

After the interrupt signal has been received, the I-address of the instruction being executed has been stored in the interrupt register, control has been transferred to a set of manually settable switches on the console which contains the first address of the interrupt subroutine, and the card interrupt routine has been completed, a programmed release interrupt command (—02) is given with an I-address of the next instruction word to return from the interrupt routine to the main routine. In addition, it is necessary to reset the condition that caused the interrupt and this is accomplished immediately upon entering the interrupt operation.

When the tape units TU1 and TU2 are being employed by the machine, all tape operations are initiated by a single operation code and its associated D-address. A tape instruction can, for example, use an 80 operation code with a data address interpreted as follows:

| Thousands | Hundreds | Tens | Units |
|---|---|---|---|
| 0—No Interrupt | 0—Read | 1—Tape Control 1 | 0 |
| 1—Interrupt | 1—Write | 2—Tape Control 2 | 1 |
| | 2—Backspace | | 2 |
| | 3—Write End of File | | 3 |
| | 4—Rewind | | 4 |
| | 5—Turn Off End of File | | 5 |
| | 6—Forward File Space | | |
| | 7—Rewind Unload | | |
| | 8—Write Delay | | |
| | 9—Backspace File | | |

The units digit indicates the tape drive to be used. The tens digit indicates the tape channel to be used. The hundreds digit indicates the operation to be performed and the thousands digit indicates the mode of operation. Operations which may cause a tape control interrupt are (1) forward file space (2) backspace file and, providing a 1 is in the thousands position of the D-address of the 80 command, interrupt will be caused from read, write and write delay. Conditions created as a result of a tape motion which can cause a tape control interrupt have been previously specified.

The interrupt routine in process will continue until such time as the operator or programmer has decided that he has performed all the operations necessary for the interrupt routine. It is now necessary to release the machine from the interrupt status. There will be programmed, then, a release interrupt code which, with its D-address, will release or reset the stacking latch associated with that address. Assuming the release interrupt code —02 is programmed with the proper D-address 0X0X, the machine will then revert back to its normal status. With the interrupt mode inoperative, the next I-address from the address register will be free to enter the interrupt register.

However, during the release interrupt command, itself, it is possible to have releasing of the first interrupt. Under this condition, the interrupt register should not be released and a new address entered but, instead, the old address should be retained in the interrupt register and a second interrupt routine started.

As was previously pointed out, tape interrupt signals are developed as a result of tape motion. For example, at the time that a reel of tape is placed in service, a metallic reflective spot is manually placed near the front of the tape and the end of the tape. This end-of-the-file reflective spot is sensed automatically, only when writing, to indicate that the tape record written is the last record to be written. The normal procedure, then, is to follow the last tape record with a recorded tape mark. This tape mark is used when reading to indicate that the end of the tape has been reached. The sensing of the reflective spot when writing or the tape mark while reading sets up an end-of-file condition and this condition results in an automatic interrupt of the main routine and the transfer of control to select locations in general storage depending upon the tape control unit being used.

Fixed length records are read into the storage unit by first setting the associated timing ring to agree with the number of words in the tape record. If a tape record is read which has fewer words than the setting of the timing ring, an inter-record-gap will occur before the timing ring stop point and an automatic interrupt will be signalled indicating a short length record condition. If the tape record is short by a partial word or a number of complete words and a partial word, the control transfer is to a tape error routine. If the tape record is read which is longer than the designated area of core storage, storage locations will be filled only to the setting of the timing ring stop point. However, the tape record will continue to be read until the inter-record-gap is reached at which time a long length record interrupt is signalled.

A program interrupt can be performed on tape read-write oeprations or card input-output operations. For example, tape interrupt can be used to inspect a master tape for activity in a file maintenance operation while the computer is processing a card application. Upon completion of the tape read operation, the automatic interrupt transfers control to the proper subroutine to determine the tape record activity. The last instruction of the subroutine returns control to the card application at the exact point at which it was interrupted.

When any read, write end-of-file tape operation is completed, a tape control status word will be generated, by appropriate logic and timing circuits, and automatically stored in an assigned location in general storage, such as location 4000 for TU1 and 4010 for TU2. The format of this word may be as follows:

| OP Code | D—Address | I—Address |
|---|---|---|
| 0 0<br>(No OP) | X X X X<br>Same as Instruction | 40 X X<br>0—TU1 1—Error<br>1—TU2 2—CLR<br>3—SLR<br>4—LLR<br>5—EOF |

Thus the status word provides machine-usable information not only as to the operation which was to be performed, but also the condition of the unit involved. This word, stored in a predetermined fixed location in general storage, is then available for not only indicating the status of the peripheral equipment, but also directing the calculator to the necessary subroutine.

As an example, a plurality of subroutines may be programmed, one for each of the tape condition codes so that, in the case of a tape error occurring in tape unit TU2, a correcting subroutine is stored in general storage at location 4011. When an interrupt operation occurs, and the machine investigates the status word location 4000 and 4010, a status word will exist at location 4010. The I-address portion of this word will be 4011 and at location 4011 will be found the first instruction of a subroutine which will correct tape errors. As another example, if an SLR (short length record) signal is given by one of the tape drives in tape unit TU1, then the I-address portion of the status word would be 4003, and this address would be the initial address of a subroutine which would be appropriate for handling a short length record.

Summarizing, the invention contemplates collection and storage of information relating to the operating condition of equipment associated with a data processing machine, the information being stored in the form of machine-usable data in the manner similar to other data which is handled by the machine. Moreover, the condition information is encoded in such manner that it can direct the machine to which subroutine may be required in order to handle the condition which is indicated.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore to be limited only as indicated by the scope of the following claims.

What is claimed is:

1. In combination, a data processing machine including a general storage device and which has peripheral units associated therewith and which operates in accordance with instructions stored in said general storage device in the form of coded data manifestations comprehending the operation to be performed, means for transferring data to and from said peripheral units and said general storage device, condition detecting means associated with each peripheral unit for detecting the operating condition of the unit and encoding the operating condition and the identification of the unit into coded data manifestations, having the same characteristics as said instructions, and means for transferring the encoded information from said condition detecting means to the general storage of the machine.

2. In combination, a data processing machine including a general storage device having a plurality of addressable locations and which has peripheral units associated therewith and which operates in accordance with instructions stored in said general storage device in the form of coded data manifestations comprehending the operation to be performed, means for transferring data to and from said peripheral units and said general storage device, condition detecting means associated with each peripheral unit for detecting the operating condition of the unit, means for encoding the operating condition and the identification of the unit into coded data manifestations having the same characteristics as said instructions, and means for transferring the encoded information from said encoding means to a predetermined location one of said plurality of addressable locations in the general storage of the machine.

3. In combination, a data processing machine of the type having a plurality of peripheral units associated therewith and controlled by stored program step words each comprised of manifestations of data comprehending the operation to be performed, and further including an addressable general storage unit, means for transferring data to and from said peripheral units and said general storage unit, condition detecting means associated with each of said peripheral units, means including said condition detecting means for generating a status word including a coded representation of the status of the peripheral unit, and means for transferring said status word to an assigned address in said general storage unit.

4. In combination, a data processing machine of the type having a plurality of peripheral units associated therewith and controlled by stored program step words each composed of manifestations of data comprehending the operation to be performed, and further including an addressable general storage, unit, means for transferring data to and from said peripheral units and said general storage unit, condition detecting means associated with each of said peripheral units, means including said condition detecting means for generating a status word, at least one portion of which represents in coded digital form one of a plurality of operating conditions as determined by said condition detecting means, and means for transferring said status word to a predetermined address in said general storage unit, whereby the operating condition of said peripheral units may be determined by reading out the word stored at said predetermined address.

5. In combination, a data processing machine of the type controlled by stored program step words each including a data portion and an instruction portion, a plurality of input-output devices associated with said machine, means for transferring data to and from said input-output devices and said general storage unit, condition detecting means for each of said input-output devices, means including said condition detecting means for encoding the operating condition of said devices in coded digital form as a status word, address generating means for generating address in general storage corresponding to the classes of the input-output devices, and means for transferring the status words having the encoded information on the operating condition of said devices to the generated address in general storage.

6. An operation checking system for a data processing machine of the type controlled by stored program step words each comprised of digital data including a data address which directs the calculator to operate on data stored in a general storage unit at a location defined by said data address, the combination comprising, a first plurality of locations in the general storage unit, each of which contains the initial program step word for a corresponding plurality of subroutine programs, a plurality of input-output devices of different classes associated with said machine, a corresponding plurality of condition detectors, one for each of said input-output devices, a second plurality of addressable assigned locations in said general storage unit, one for each class of said input-output devices, means including said condition detectors for generating a status word including the designation of the associated input-output unit and the operating condition of the unit, means for transferring said status word to a location in said second plurality of storage locations in accordance with the class of input-output devices, the operating condition of the unit being encoded in a portion of a status word, and means for governing the machine so that the machine, when referred to one of said second plurality of storage locations, will be subsequently referred to a selected one of said first plurality of storage locations, in accordance with the operating condition of the involved input-output device.

7. In combination, a data processing machine having a number of asynchronously operable peripheral equipment devices, means for transferring data to and from said peripheral equipment devices and said data processing machine, means associated with each of said devices for generating signals respectively identifying each of said devices and for generating signals representative of various possible condition states of said associated device, means for registering said generated signals, and means effective to transmit signals representative of said registered states and said identifying signals to said data processing machine.

8. A data processing system comprising, in combination, computer apparatus, data storage apparatus, control apparatus for controlling the operation of said system, a plurality of asynchronously operable peripheral data handling devices, means responsive to said control apparatus for initiating data handling operations of said peripheral devices, means for transferring data to and from said operating peripheral devices and said data storage apparatus, means associated with each of said devices for generating signals respectively representative of a peripheral equipment identification assigned to each of said devices and for generating signals representative of various possible condition states of said associated device, means for registering said generated signals, and means effective to transmit signals representative of said registered states and said identification signals to said control apparatus for modifying the control operation thereof.

9. A data processing system comprising, in combination, a computer mechanism, data storage apparatus, control means for controlling the operation of said system, a plurality of asynchronously operable peripheray data handling devices, means responsive to said control means for initiating data handling operations of said peripheral devices, each peripheral device having an assigned identification and including means for generating a signal indication of said identity, means for transferring data to and from said operating peripheral devices and said data storage means, means monitoring the operation of each said devices and storing related signal indications of a plurality of possible states thereof, and means effective for transferring signals representative of said related states and said related identity indications to said control means for modifying the operation thereof.

References Cited in the file of this patent

UNITED STATES PATENTS

| | | |
|---|---|---|
| 2,682,573 | Hunt | June 29, 1954 |
| 2,696,599 | Holbrook | Dec. 7, 1954 |
| 2,702,380 | Brustman | Feb. 15, 1955 |
| 2,721,990 | McNaney | Oct. 25, 1955 |
| 2,764,634 | Brooks | Sept. 25, 1956 |
| 2,942,242 | Sharp | June 21, 1960 |